US012203296B2

(12) United States Patent
Guo et al.

(10) Patent No.: US 12,203,296 B2
(45) Date of Patent: Jan. 21, 2025

(54) HIDDEN VEHICLE DOOR HANDLE MOUNTING MECHANISM AND VEHICLE

(71) Applicant: GREAT WALL MOTOR COMPANY LIMITED, Baoding (CN)

(72) Inventors: Xinfei Guo, Baoding (CN); He Song, Baoding (CN); Xiuquan Xue, Baoding (CN); Zhijie He, Baoding (CN); Xi Chen, Baoding (CN); Fanxiang Meng, Baoding (CN); Jinzhong Kang, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 385 days.

(21) Appl. No.: 17/765,088

(22) PCT Filed: Oct. 29, 2020

(86) PCT No.: PCT/CN2020/124794

§ 371 (c)(1),
(2) Date: Mar. 30, 2022

(87) PCT Pub. No.: WO2021/098470

PCT Pub. Date: May 27, 2021

(65) Prior Publication Data

US 2022/0396978 A1 Dec. 15, 2022

(30) Foreign Application Priority Data

Nov. 22, 2019 (CN) ......................... 201911156862.2

(51) Int. Cl.
*E05B 79/06* (2014.01)
*E05B 85/10* (2014.01)

(52) U.S. Cl.
CPC ............ *E05B 79/06* (2013.01); *E05B 85/107* (2013.01)

(58) Field of Classification Search
CPC ...... E05B 85/10; E05B 85/103; E05B 85/107; E05B 85/50; E05B 85/5003; E05B 85/00; E05B 79/06
See application file for complete search history.

(56) References Cited

U.S. PATENT DOCUMENTS 4,875,726 A * 10/1989 Thau ........................ E05B 79/06
292/DIG. 60
9,744,627 B1 8/2017 Thrasher
(Continued)

FOREIGN PATENT DOCUMENTS

CN 206667986 U 11/2017
CN 108505849 A 9/2018
(Continued)

OTHER PUBLICATIONS

First Office Action issued on Jan. 8, 2021 for application No. CN201911156862.2.
(Continued)

*Primary Examiner* — Michael P Ferguson
*Assistant Examiner* — Thomas L Neubauer
(74) *Attorney, Agent, or Firm* — Nath, Goldberg & Meyer; Joshua B. Goldberg

(57) ABSTRACT

The application provides a mounting mechanism for a hidden vehicle door handle and a vehicle, and belongs to the technical field of vehicles. The mounting mechanism comprises an outer plate mounting element, a base element and tolerance absorption assemblies; the outer plate mounting element is configured to be disposed on the inner side of a vehicle door outer plate and integrally disposed on the vehicle door outer plate; the base element is configured to be connected with a handle and clamped and fixed to a designated mounting position by the outer plate mounting element; and the tolerance absorption assemblies are fixedly connected with the base element, disposed between mount- (Continued)

ing holes and bolts on a vehicle door outer plate reinforcing plate, and configured to absorb tolerances between the bolts and the mounting holes.

14 Claims, 9 Drawing Sheets

(56) References Cited

U.S. PATENT DOCUMENTS

| | | | |
|---|---|---|---|
| 2019/0301209 | A1 | 10/2019 | Löw et al. |
| 2019/0309547 | A1 | 10/2019 | Oct et al. |

FOREIGN PATENT DOCUMENTS

| | | | |
|---|---|---|---|
| CN | 108505850 | A | 9/2018 |
| CN | 109154317 | A | 1/2019 |
| CN | 109552013 | A | 4/2019 |
| CN | 110306889 | A | 10/2019 |
| DE | 102017130605 | A1 | 6/2019 |
| EP | 3456906 | A1 | 3/2019 |
| FR | 3057896 | A1 | 4/2018 |
| WO | 2016/126284 | A1 | 8/2016 |
| WO | 2017/211550 | A1 | 12/2017 |
| WO | 2018015865 | A1 | 1/2018 |

OTHER PUBLICATIONS

Second Office Action issued on Feb. 20, 2021 for application No. CN201911156862.2.

International Search Report issued on Feb. 1, 2021 for application No. PCT/CN2020/124794.

Extended European Search Report dated Oct. 26, 2022 issued in corresponding European Application No. 20891373.1.

* cited by examiner

HIDDEN VEHICLE DOOR HANDLE MOUNTING MECHANISM AND VEHICLE

CROSS REFERENCE TO RELEVANT APPLICATIONS

This is a National Phase Application filed under 35 U.S.C. 371 as a national stage of PCT/CN2020/124794, filed Oct. 29, 2020, an application claiming the benefit of Chinese Patent Application No. 201911156862.2, filed Nov. 22, 2019, the content of each of which is hereby incorporated by reference in its entirety.

TECHNICAL FIELD

The application relates the technical field of vehicles and, more particularly, to a mounting mechanism for a hidden vehicle door handle and a vehicle comprising the mounting mechanism for the hidden vehicle door handle.

BACKGROUND

Vehicle door handles are used for opening vehicle doors, some of the vehicle door handles are designed in a hidden manner in consideration of beauty and to reduce the wind resistance coefficient, in another word, the vehicle door handles automatically stretch out after the vehicle doors are unlocked to be used for opening the vehicle doors by passengers, and the handles are automatically hidden inside the vehicle doors when vehicles start to run, thereby reducing the wind resistance and the oil consumption and facilitating energy conservation and emission reduction. The hidden vehicle door handles are also provided with protective handles, so that the handles are prevented from being exposed out of vehicle door metal plates, so that the handles are prevented from being eroded by burning sun, wind and rain, etc.

It is required that handles are mounted on vehicle door outer plate reinforcing plates on the aspect of strength, and the handles and vehicle door outer plates on the peripheries of the handles have uniform gaps and flushes on the aspect of appearance attractiveness, this requires that handle assemblies may be adjusted according to appearances during mounting. At present, handle bases are usually directly connected to mounting holes in vehicle door outer plate reinforcing plates by bolts so that gaps between the handles and the vehicle door outer plates on the peripheries of the handles may be adjusted by the handle mounting holes. However, uniform flushes between the handles and the vehicle door outer plates may not be ensured due to a relatively large element error and unavailable flush adjustment in a bolt connection manner, and uniform gaps between the handles and the vehicle door outer plates are also hardly ensured in a limit state due to limited adjustment amounts of the handle mounting holes.

SUMMARY

The application aims at providing a mounting mechanism for a hidden vehicle door handle, so as to solve the technical problem that an existing mounting structure for a hidden handle hardly achieves a uniform gap and flush between the handle and a vehicle door outer plate.

In order to fulfill the above objective, the technical solution used by the application is as follows: a mounting mechanism for a hidden vehicle door handle is provided, comprising:

- an outer plate mounting element, configured to be disposed on the inner side of a vehicle door outer plate and integrally disposed on the vehicle door outer plate;
- a base element, configured to be connected with a handle and clamped and fixed to a designated mounting position by the outer plate mounting element; and
- tolerance absorption assemblies fixedly connected with the base element, configured to be disposed between mounting holes and bolts on a vehicle door outer plate reinforcing plate, and absorb tolerances between the bolts and the mounting holes, wherein the vehicle door outer plate reinforcing plate is fixedly connected to the inner side of the vehicle door outer plate.

As another embodiment of the application, the outer plate mounting element comprises a plurality of outer plate clamping plates integrally disposed on the vehicle door outer plate, the plurality of outer plate clamping plates are configured to surround a handle hole in the vehicle door outer plate, first bayonets are formed in the outer plate clamping plates, and first buckles clamped and fixed to the first bayonets are disposed on the base element.

As another embodiment of the application, the outer plate mounting element further comprises an outer plate limiting plate integrally disposed on the vehicle door outer plate, the outer plate limiting plate is configured to surround the handle hole, groove-shaped positioning structures sleeving the outer plate limiting plate are disposed on the base element, and the first buckles are disposed in the groove-shaped positioning structures.

As another embodiment of the application, the base element comprises:

- a mounting backing ring, disposed on the periphery of the outer plate limiting plate in a sleeving manner and provided with via holes allowing the outer plate clamping plates to penetrate;
- a base mounting ring, disposed on the periphery of the mounting backing ring in a sleeving manner and provided with the first buckles, wherein the mounting backing ring and the base mounting ring are matched to form the groove-shaped positioning structures; and
- a base, disposed on the inner side of the base mounting ring, clamped with the base mounting ring, and further configured to be connected with the handle.

As another embodiment of the application, positioning concavities are formed in the mounting backing ring, and positioning convex ribs correspondingly inserted into the positioning concavities are disposed on the outer side face of the base mounting ring.

As another embodiment of the application, a plurality of second buckles are disposed on the inner side face of the base mounting ring, and surround the base mounting ring, and a plurality of second bayonets clamped with the second buckles are formed in the base.

As another embodiment of the application, a plurality of positioning pillars are disposed on the inner side face of the base mounting ring, and surround the base mounting ring, and a plurality of positioning holes allowing the positioning pillars to be inserted and positioned therein are formed in the base.

As another embodiment of the application, each of the tolerance absorption assemblies comprises:

- a base mounting ring, integrally disposed on the base element, wherein a spiral protrusion is disposed on the inner ring surface of the base connecting ring;
- a buckle type connecting seat, located on the inner side of the base connecting ring, clamped with the base connecting ring, and configured to be inserted into the corresponding mounting hole;

an elastic clamping pin, disposed between the base connecting ring and the buckle type connecting seat, respectively connected with the base connecting ring and the buckle type connecting seat, and configured to elastically deform on a plane parallel to the radial surface of the corresponding mounting hole; and a stabilizing bock, provided with a spiral groove matched with the spiral protrusion in an inserting manner.

Through holes allowing the bolts to penetrate are formed in the stabilizing blocks, the elastic clamping pins and the buckle type connecting seats.

As another embodiment of the application, each of the elastic clamping pins comprises:

a first clamping pin connecting part connected with the buckle type connecting seat;

elastic arms, disposed on the periphery of the first clamping pin connecting part, wherein one end of each of the elastic arms is connected with the first clamping pin connecting part; and second clamping pin connecting parts, which are disposed at the other ends of the elastic arms, correspond to the elastic arms one to one, and are connected with the base connecting ring.

The mounting mechanism for the hidden vehicle door handle provided by the application has the beneficial effects: compared with the prior art, according to the mounting mechanism for the hidden vehicle door handle of the application, firstly the base element is prefixed to the vehicle door outer plate in a clamping manner during mounting without position adjustment by the holes matched with the bolts, it may be effectively ensured that the base element is precisely prefixed to the designated mounting position at a minimum error by positioning the base element in a clamped and limited manner, and then the uniform gap and flush between the handle and the vehicle door outer plate may be effectively ensured; and the base element is finally fixed to the vehicle door outer plate reinforcing plate by the tolerance absorption assemblies after being prefixed, so as to absorb manufacturing tolerances and connecting errors, thereby effectively fixing the base element to the vehicle door outer plate reinforcing plate.

The application further provides a vehicle, comprising the above mounting mechanism for the hidden vehicle door handle.

The vehicle provided by the application has the beneficial effects: compared with the prior art, according to the vehicle, the appearances of a vehicle door and the handle are more attractive on the basis of meeting the requirement on the mounting strength of the handle by adopting the above mounting structure for the hidden vehicle door handle, which achieves the uniform gap and flush of the handle.

The above description is only the overview of the technical solutions of the application, implementation may be performed according to the content of the specification in order to more clearly understand the technical means of the application, and specific implementations of the application are listed below in order to make the above and other objectives, features and advantages of the application more obvious and understandable.

BRIEF DESCRIPTION OF THE DRAWINGS

In order to more clearly illustrate technical solutions in embodiments of the application, accompanying drawings needed in description of the embodiments or the prior art will be simply introduced below, obviously, the drawings in the description below are some embodiments of the application, and those ordinarily skilled in the art may obtain other drawings according to these drawings without involving creative labor.

In the figures, 1, outer plate mounting element; 101, outer plate clamping plate; 102, first bayonet; 103, outer plate limiting plate;

2, base element; 201, mounting backing ring; 202, via hole; 203, base mounting ring; 204, first buckle; 205, base; 206, positioning trough; 207, positioning convex rib; 208, second buckle; 209, second bayonet; 210, positioning column; 211, positioning hole; 212, convex ring; 3, tolerance absorption element; 301, base connecting ring;

302, buckle type connecting seat; 3021, connecting seat body; 3022, clamping hook connecting part; 3023, clamping hook; 3024, seat body buckle; 3025, buckle notch; 3026, rotary positioning groove; 3027, clamping pin notch;

303, elastic clamping pin; 3031, first clamping pin connecting part; 3032, elastic arm; 3033, second clamping pin connecting part; 3034, clamping pin buckle; 3035, buckle limiting protrusion;

304, stabilizing block; 306, spiral protrusion; 307, spiral groove; 308, clamping protrusion; 309, local overhard point; 310, inserting hole;

4, vehicle door outer plate; 5, handle; 6, vehicle door outer plate reinforcing plate; 7, mounting hole; 8, handle hole; and 9, bolt.

DETAILED DESCRIPTION OF THE EMBODIMENTS

To make the objectives, technical solutions, and advantages of the embodiments of the application clearer, the following clearly and completely describes the technical solutions in the embodiments of the application with reference to the accompany drawings in the embodiments of the application. Obviously, the descried embodiments are part, not all of the embodiments of the application. Based on the embodiments in the application, all other embodiments obtained by those ordinarily skilled in the art without involving creative labor belong to the protection scope of the application.

In order to make the technical problems to be solved, technical solutions and beneficial effects of the application clearer and more understandable, the application may be further illustrated in details below with reference to the drawings and the embodiments. It should be understood that the specific embodiments described here are only used for explaining the application instead of limiting it.

Figure 1:
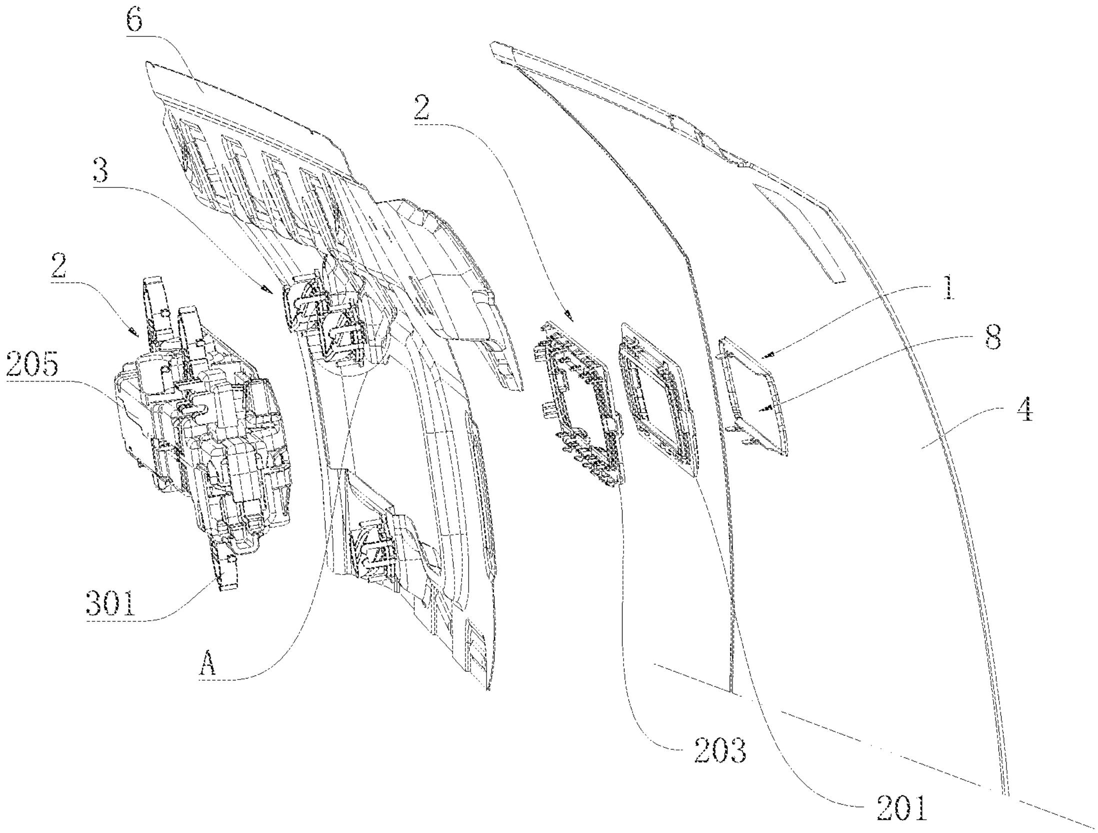
FIG. 1 is an explosive view of an element structure of a mounting mechanism for a hidden vehicle door handle provided by an embodiment of the application, a vehicle door outer plate and a vehicle door outer plate reinforcing plate.

Referring to FIG. 1, which illustrates a mounting mechanism for a hidden vehicle door handle provided by the present application. The mounting mechanism for the hidden vehicle door handle, includes an outer plate mounting element 1, a base element 2 and a tolerance absorption element 3. The outer plate mounting element 1 is configured to be disposed on the inner side of a vehicle door outer plate 4, the outer plate mounting element 1 and the vehicle door outer plate 4 are disposed as an entirety; the base element 2 is configured to be connected with a handle 5 and clamped and fixed to a designated mounting position by the outer plate mounting element 1; the tolerance absorption element 3 is fixedly connected with the base element 2 and configured to be disposed between mounting holes 7 and bolts 9 on a vehicle door outer plate reinforcing plate 6 and absorb tolerance between the bolts 9 and the mounting holes 7; and the vehicle door outer plate reinforcing plate 6 is fixedly connected to the inner side of the vehicle door outer plate 4.

It should be noted that, taking FIG. 1 as an example, the direction from the vehicle door outer plate 4 to the vehicle door outer plate reinforcing plate 6 is an inward direction, and the opposite direction is an outward direction.

The mounting mechanism for the hidden vehicle door handle provided by the present application, compared with the prior art, when mounting the mechanism, firstly the base element 2 is prefixed to the vehicle door outer plate 4 in a clamping manner, there is no need to adjust position by the holes matched with the bolts, it may be effectively ensured that the base element 2 is precisely prefixed to the designated mounting position at a minimum error by positioning the base element 2 in the clamping manner, and then the uniform gap and flush between the handle 5 and the vehicle door outer plate 4 may be effectively ensured; and the base element 2 is finally fixed to the vehicle door outer plate reinforcing plate 6 by the tolerance absorption element 3 after being prefixed, so as to absorb manufacturing tolerances and connecting errors, thereby effectively fixing the base element 2 to the vehicle door outer plate reinforcing plate 6.

Figure 2:
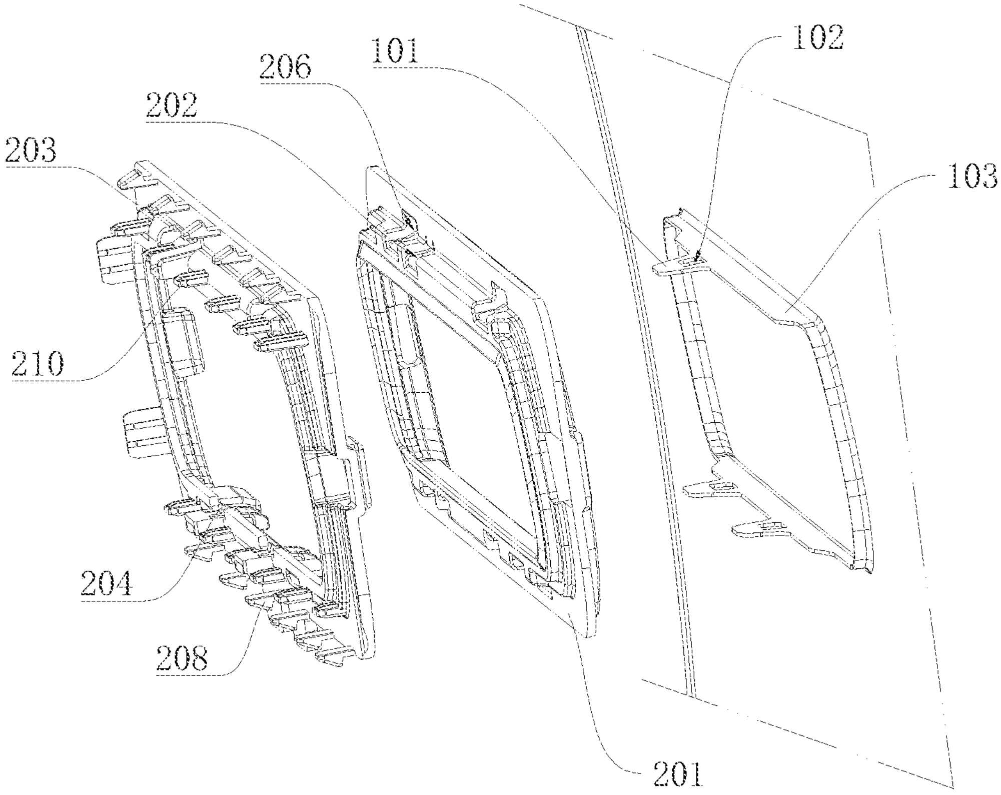
FIG. 2 is an explosive view of an element structure of a base mounting ring, a mounting backing ring and an outer plate mounting element in FIG. 1.
Figure 3:
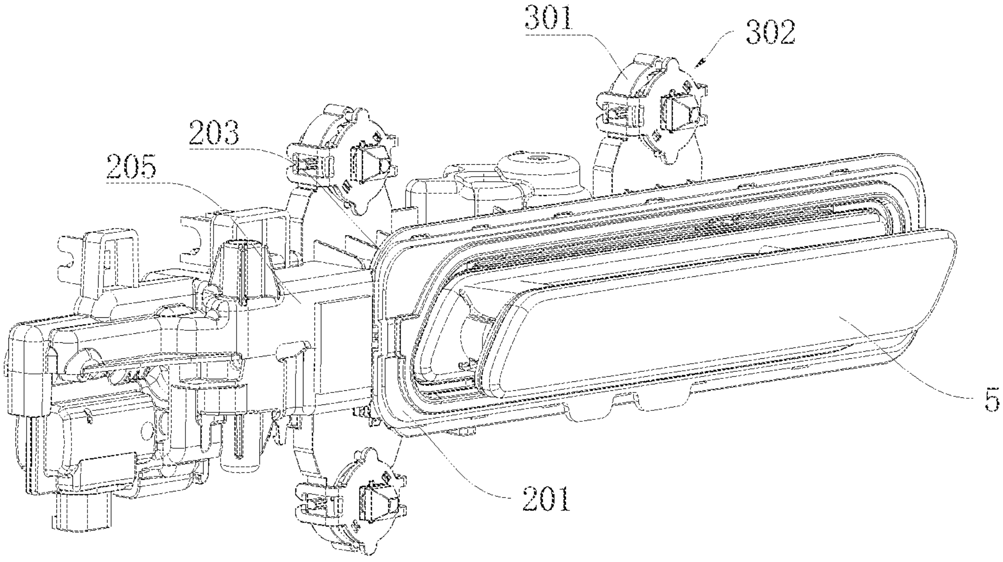
FIG. 3 is a stereoscopic diagram of an element structure of a mounting mechanism for a hidden vehicle door handle provided by an embodiment of the application and the handle.
Figure 4:
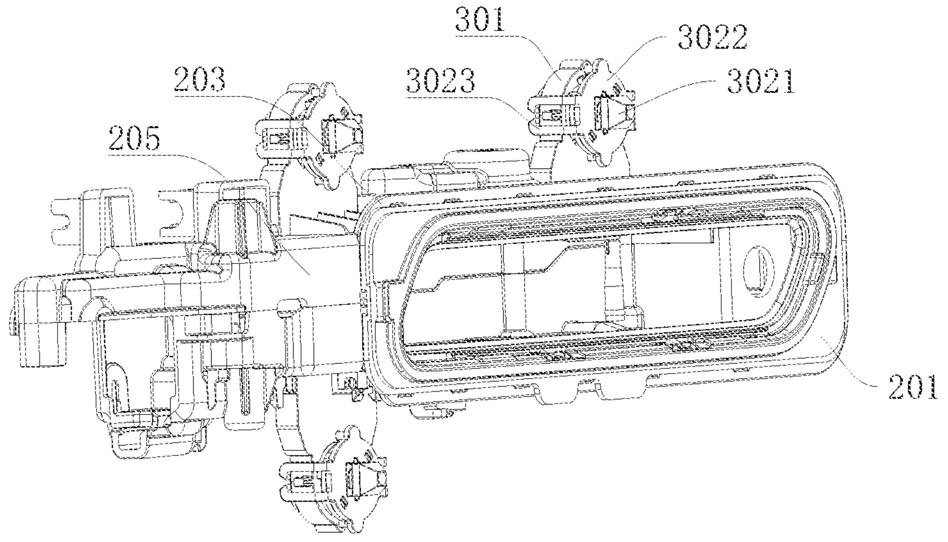
FIG. 4 is a first stereoscopic diagram of an element structure of a base element and a tolerance absorption element used by an embodiment of the application.
Figure 5:
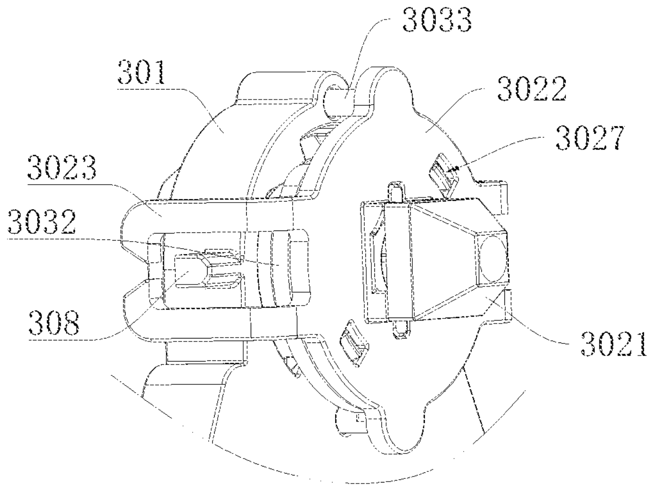
FIG. 5 is a local structure enlarged diagram of FIG. 4.

As a specific implementation of the mounting mechanism for the hidden vehicle door handle provided by the present application, referring to FIG. 1 and FIG. 2, in order to clamp and fix the outer plate mounting element 1 to the base element 2, the outer plate mounting element 1 includes a plurality of outer plate clamping plates 101, which the plurality of outer plate clamping plates 101 and the vehicle door outer plate 4 are disposed as an entirety, the plurality of outer plate clamping plates 101 are disposed as surrounding a handle hole 8 on the vehicle door outer plate 4, first bayonets 102 are formed in the outer plate clamping plates 101, and first buckles 204 clamped and fixed to the first bayonets 102 are disposed on the base element 2. The handle 5 and a control element for controlling the handle to move are mounted on the base element 2, through hole structures corresponding to the handle hole 8 are also disposed on the vehicle door outer plate reinforcing plate 6, the outer plate clamping plates 101 correspond to the through hole structures, and the first buckles 204 on the base element 2 are capable to be clamped to the first bayonets 102, thereby prefixing the base element 2. The structure is simple and compact, the occupied space is small, and the internal space of the vehicle door may be reasonably utilized.

As a specific implementation of the embodiment of the application, referring to FIG. 1 and FIG. 2, the outer plate mounting element 1 further includes an outer plate limiting plate 103, the outer plate limiting plate 103 and the vehicle door outer plate 4 are disposed as an entirety, the outer plate limiting plate 103 is disposed as surrounding the handle hole 8, groove-shaped positioning structure sleeving the outer plate limiting plate 103 are disposed on the base element 2, and the first buckles 204 are disposed in the groove-shaped positioning structure. The groove-shaped positioning structure are matched with the outer plate limiting plate 103 for achieving the function of guidance and prepositioning to the base element 2 during clamping and inserting, the base element 2 may be further fixed after being clamped in place, and therefore the positional accuracy of the clamped base element 2 is ensured.

As an embodiment of the application, referring to FIG. 1 to FIG. 4 and FIG. 6 to FIG. 9, the base element 2 includes a mounting backing ring 201, a base mounting ring 203 and a base 205. The mounting backing ring 201 is disposed on the periphery of the outer plate limiting plate 103 in a sleeving manner and provided with via holes 202 allowing the outer plate clamping plates 101 to penetrate; the base mounting ring 203 is disposed on the periphery of the mounting backing ring 201 in a sleeving manner and provided with the first buckles 204, and the mounting backing ring 201 and the base mounting ring 203 are matched to form the groove-shaped positioning structure; and the base 205 is disposed on the inner side of the base mounting ring 203, the base 205 is clamped with the base mounting ring 203, and further configured to be connected with the handle 5. The mounting backing ring 201 and the base mounting ring 203 are disposed between the vehicle door outer plate reinforcing plate 6 and the vehicle door outer plate 4, in order to facilitate mounting, the mounting backing ring and the base mounting ring are firstly fixed to the vehicle door outer plate 4 in a clamping manner to make relative positions of the base mounting ring 203 and the handle hole 8 fixed, and then the base 205 is clamped and fixed to the base mounting ring 203 to make relative positions of the base 205 and the handle hole 8 fixed and relative positions between the handle mounted on the base 205 and the handle hole 8 fixed, thereby ensuring the uniform gap and flush of the appearance, and finally the base 205 is finally fixed by the tolerance absorption element 3 and the bolts 9.

Specifically, the mounting backing ring 201 is a rubber gasket, so that it has better elasticity.

As a specific implementation of the embodiment of the application, referring to FIG. 2, FIG. 6, FIG. 8 and FIG. 9, positioning concavities 206 are disposed on the mounting backing ring 201, and positioning convex ribs 207 correspondingly inserted into the positioning concavities 206 are disposed on the outer side face of the base mounting ring 203. The positioning concavities 206 and the positioning convex ribs 207 are matched to perform further positioning, so that the relative displacement between the mounting backing ring 201 and the base mounting ring 203 is prevented, and therefore the positional accuracy of the clamped base mounting ring 203 is ensured.

As a specific implementation of the embodiment of the application, referring to FIG. 2 and FIG. 6 to FIG. 9, in order to make the base 205 and the base mounting ring 203 clamped and fixed, a plurality of second buckles 208 are disposed on the inner side face of the base mounting ring 203, and surround the base mounting ring 203, and a plurality of second bayonets 209 clamped with the second buckles 208 are formed in the base 205. The clamping structure is simple and compact, the occupied space is small, and the internal space of the vehicle door may be reasonably utilized.

As a specific implementation of the embodiment of the application, referring to FIG. 2 and FIG. 6 to FIG. 9, a plurality of positioning pillars 210 are disposed on the inner side face of the base mounting ring 203, and surround the base mounting ring 203, and a plurality of positioning holes 211 allowing the positioning pillars 210 to be inserted and positioned therein are disposed in the base 205. The positioning holes 211 and the positioning pillars 210 are matched to perform further positioning, relative displacement between the base 205 and the base mounting ring 203 is prevented, and therefore the positional accuracy of the clamped base 205 is ensured.

Specifically, there are three outer plate clamping plates 101, six positioning concavities 206, 14 second buckles 208 and 14 positioning pillars 210. There are many direct clamping structures and auxiliary limiting structures, so that the gap and flush between the assembled handle 5 and vehicle door outer plate 4 are comprehensively ensured.

As a specific implementation of the embodiment of the application, referring to FIG. 1, FIG. 3 to FIG. 7 and FIG. 10 to FIG. 13, in order to make the tolerance absorption element 3 absorb manufacturing errors and connecting errors, and meanwhile ensure the connecting strength between the bolts 9 and the mounting holes 7, each of the tolerance absorption element 3 includes a base connecting ring 301, a buckle type connecting seat 302, an elastic clamping pin 303 and a stabilizing block 304. The base mounting rings 301 are disposed on the base element 2 which are forming as an entirety, and spiral protrusions 306 are disposed on the inner ring surfaces of the base connecting rings 301; the buckle type connecting seats 302 are located on the inner sides of the base connecting rings 301, clamped with the base connecting rings 301, and configured to be inserted into the mounting holes 7; the elastic clamping pins 303 are disposed between the base connecting rings 301 and the buckle type connecting seats 302, and connected with the base connecting rings 301 and the buckle type connecting seats 302, respectively, and configured to elastically deform on a plane parallel to the radial surfaces of the mounting holes 7; the stabilizing bocks 304 are disposed with spiral grooves 307 matched with the spiral protrusions 306 in an inserting manner; and through holes allowing the bolts 9 to penetrate are formed in the stabilizing blocks 304, the elastic clamping pins 303 and the buckle type connecting seats 302, and the bolts 9 penetrate through the through holes in the stabilizing blocks 304 and the elastic clamping pins 303 and extend into the through holes of the buckle type connecting seats 302, so that the buckle type connecting seats 302 expand till being fixedly connected with the mounting holes 7.

Specifically, the strength of the connecting positions of the base connecting rings 301 and the base 205 is ensured by disposing reinforcing ribs between the base connecting rings 301 and the base 205 as the base connecting rings 301 is disposed as projecting out of the base 205.

The tolerance absorption element 3 may absorb manufacturing tolerances and welding errors of a vehicle door inner plate and the vehicle door outer plate as the elastic clamping pins 303 may elastically deform (elastically deform in a direction X and a direction Z) on the plane parallel to the radial surfaces of the mounting holes 7; and the tolerance absorption element 3 may absorb tolerances (tolerances in a direction Y) of the mounting holes 7 in the axial direction as the stabilizing blocks 304 and the base connecting rings 301 are in spiral fit by the spiral grooves 307 and the spiral protrusions 306. The bolts 9 may be smoothly fixedly connected with the mounting holes 7 without adjusting the position of the clamped base element 2 as the tolerance absorption element 3 may absorb the tolerances and errors in the direction X, the direction Y and the direction Z. In addition, the stabilizing blocks 304 and the base connecting rings 301 are in spiral fit, so as to increase friction to avoid abnormal sound.

Specifically, the thickness of the spiral fit positions on the stabilizing blocks 304 is about 14 mm.

As a specific implementation of the embodiment of the application, referring to FIG. 10 to FIG. 13, each of the elastic clamping pins 303 includes a first clamping pin connecting part 3031, elastic arms 3032 and second clamping pin connecting parts 3033. The first clamping pin connecting parts 3031 are connected with the buckle type connecting seats 302; the plurality of elastic arms 3032 are disposed on the peripheries of the first clamping pin connecting parts 3031, one ends of the elastic arms 3032 are connected with the first clamping pin connecting parts 3031, and the plurality of elastic arms 3032 are configured to elastically deform on the plane parallel to the radial surfaces of the mounting holes 7; and the second clamping pin connecting parts 3033 are disposed at the other ends of the elastic arms 3032, correspond to the elastic arms 3032 one to one, and are connected with the base connecting rings 301. The plurality of elastic arms 3032 elastically deform on the plane parallel to the radial surfaces of the mounting holes 7 to absorb the tolerances in the direction X and the direction Z, connections between the elastic clamping pins 303 and the buckle type connecting seats 302 and between the elastic clamping pins 303 and the base connecting rings 301 is also ensured by the first clamping pin connecting parts 3031 and the second clamping pin connecting parts 3033, and the elastic clamping pins 303 may be disposed into flat structures, so that the occupied space is small, and the deformability is reliable.

As a specific implementation of the embodiment of the application, referring to FIG. 10 to FIG. 13, the elastic arms 3032 are arc-shaped arms, and the centers of curvature of the arc-shaped arms all face the first clamping pin connecting parts 3031. As the arc-shaped arms have the capacity of elastically deforming in a plurality of directions, two arc-shaped arms are symmetrically disposed on the peripheral center of each of the first clamping pin connecting parts 3031.

As a specific implementation of the embodiment of the application, which is not shown in the figure, the elastic arms 3032 are wavy or spiral similar to springs, four elastic arms may be uniformly disposed around each of the first clamping pin connecting parts 3031, and the elastic arms in the above shape have good elastic deformability in their respective axial directions and also have certain elastic deformability in their respective radial directions, thereby achieving the effect of elastically deforming in the plurality of directions by disposing four or more elastic arms 3032.

As a specific implementation of the embodiment of the application, referring to FIG. 3 to FIG. 7 and FIG. 10 to FIG. 13, clamping protrusions 308 are disposed on the two sides of the base connecting rings 301, each of the buckle type connecting seat 302 includes a connecting seat body 3021, a clamping hook connecting part 3022 and a clamping hook 3023 disposed on the clamping hook connecting part 3022; seat body buckles 3024 are disposed on the connecting seat bodies 3021, buckle notches 3025 and rotary positioning grooves 3026 corresponding to the buckle notches 3025 are formed in the clamping hook connecting parts 3022, clamping pin notches 3027 are further formed in the clamping hook connecting parts 3022, clamping pin buckles 3034 matched with the clamping pin notches 3027 in a clamping manner are disposed on the first clamping pin connecting parts 3031, and buckle limiting protrusions 3035 corresponding to the buckle notches 3025 are further disposed on the first clamping pin connecting parts 3031.

Figure 10:
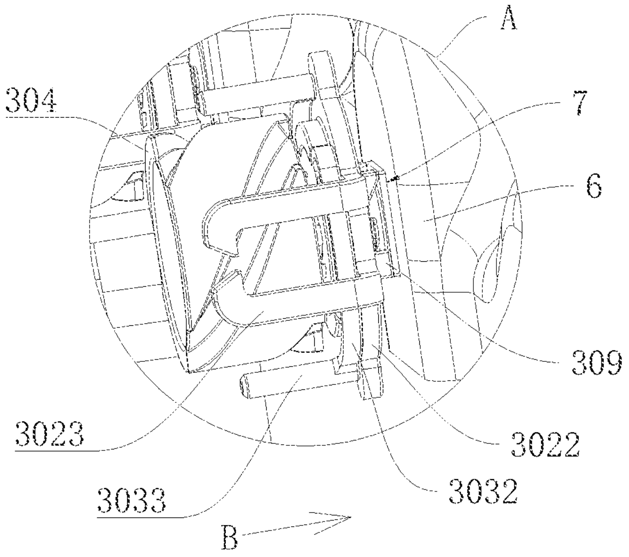
FIG. 10 is an enlarged diagram of part A in FIG. 1.
Figure 11:
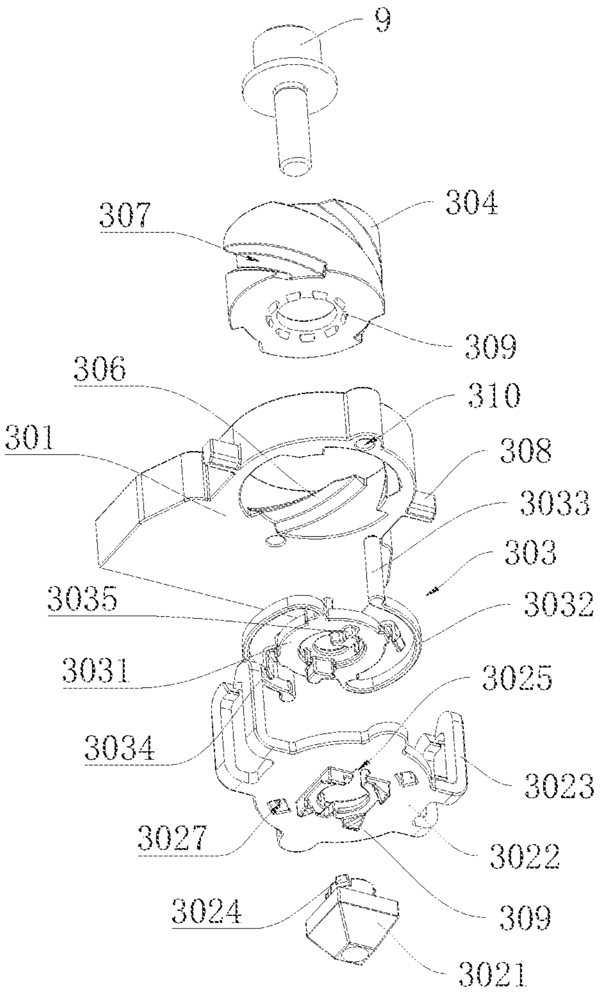
FIG. 11 is a first explosive decomposition diagram of a tolerance absorption element used by an embodiment of the application.
Figure 12:
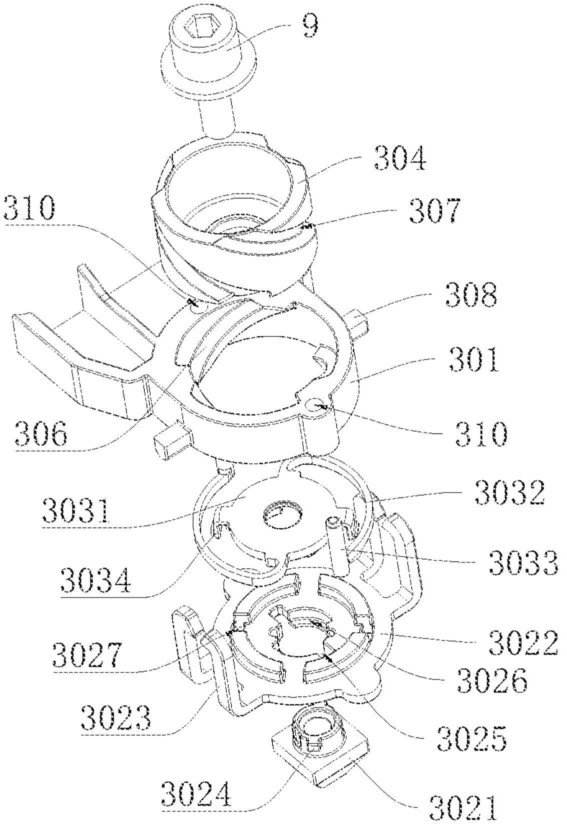
FIG. 12 is a second explosive decomposition diagram of a tolerance absorption element used by an embodiment of the application.
Figure 13:
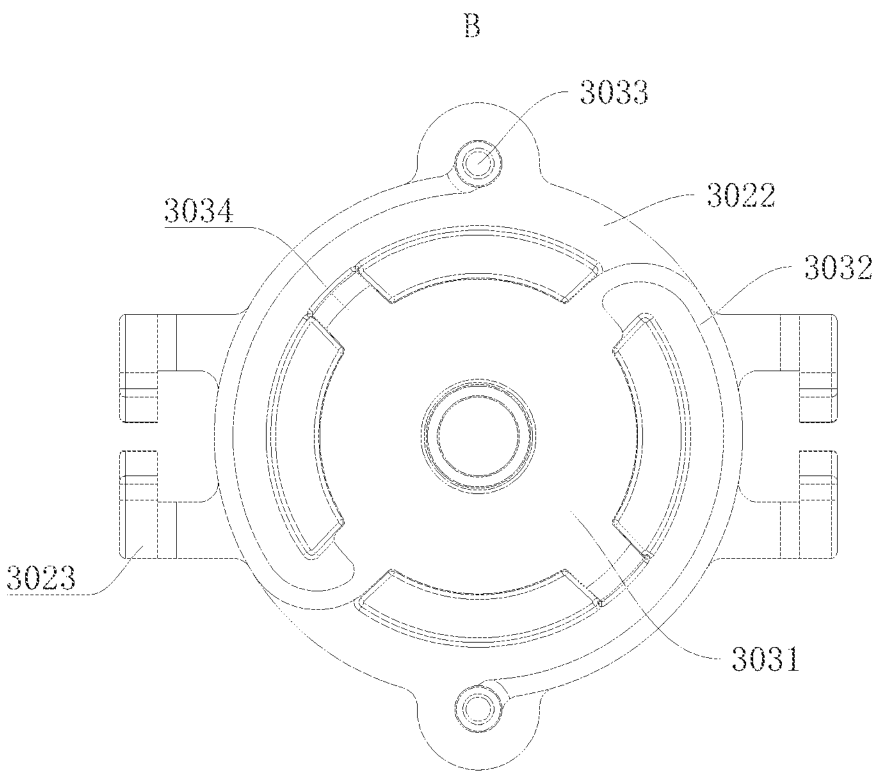
FIG. 13 is a schematic diagram of a B-directional element structure of a buckle type connecting seat and an elastic clamping pin in FIG. 10.

As a specific implementation of the embodiment of the application, referring to FIG. 10 and FIG. 11, local overhard points 309 are disposed on the outer side faces of the clamping hook connecting parts 3022 and the outer side faces of the stabilizing blocks 304 respectively, so that abnormal sound caused by large surface contact relative movements between the clamping hook connecting parts 3022 and the vehicle door outer plate reinforcing plate 6 and between the stabilizing blocks 304 and the first clamping pin connecting parts 3031 is avoided.

Figure 6:
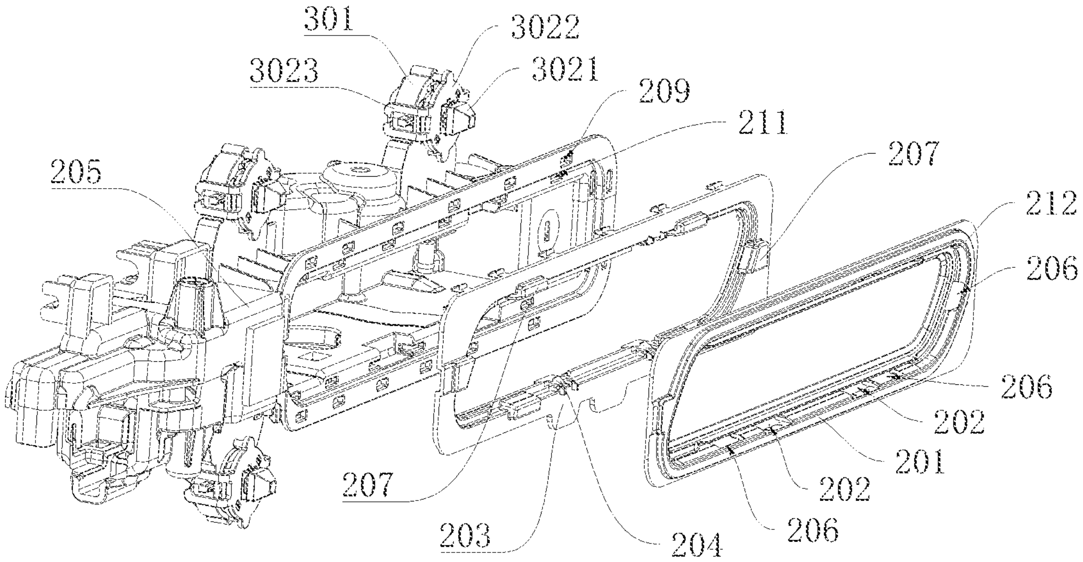
FIG. 6 is an explosive view of an element structure of a base element and a tolerance absorption element used by an embodiment of the application.
Figure 7:
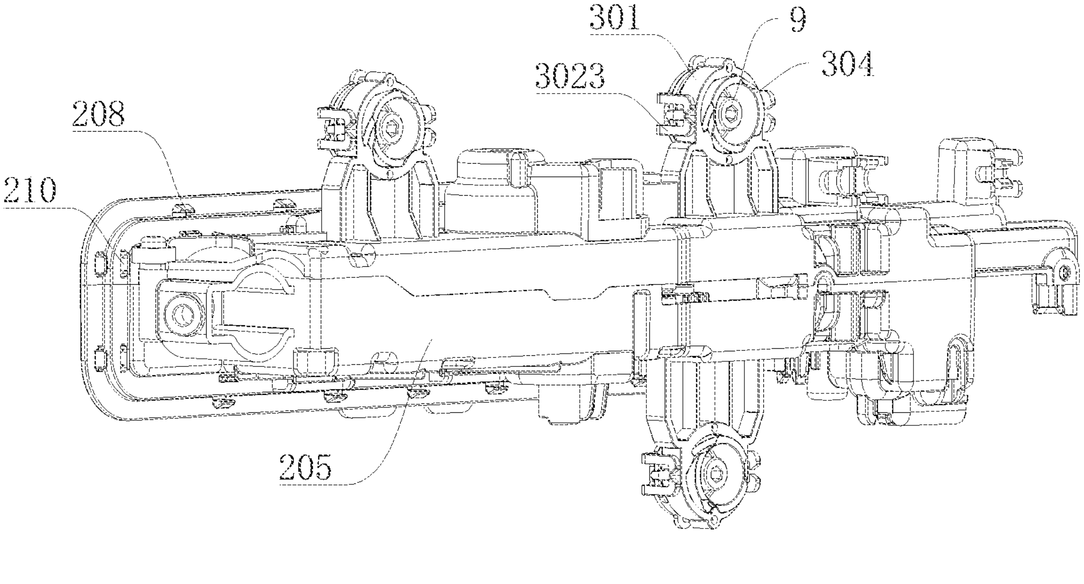
FIG. 7 is a second stereoscopic diagram of an element structure of a base element and a tolerance absorption element used by an embodiment of the application.
Figure 8:
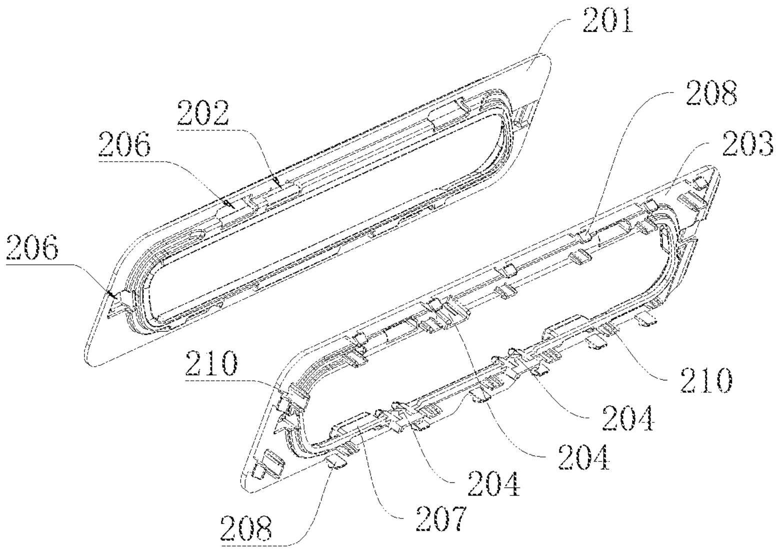
FIG. 8 is a first explosive view of an element structure of a mounting backing ring and a base mounting ring used by an embodiment of the application.
Figure 9:
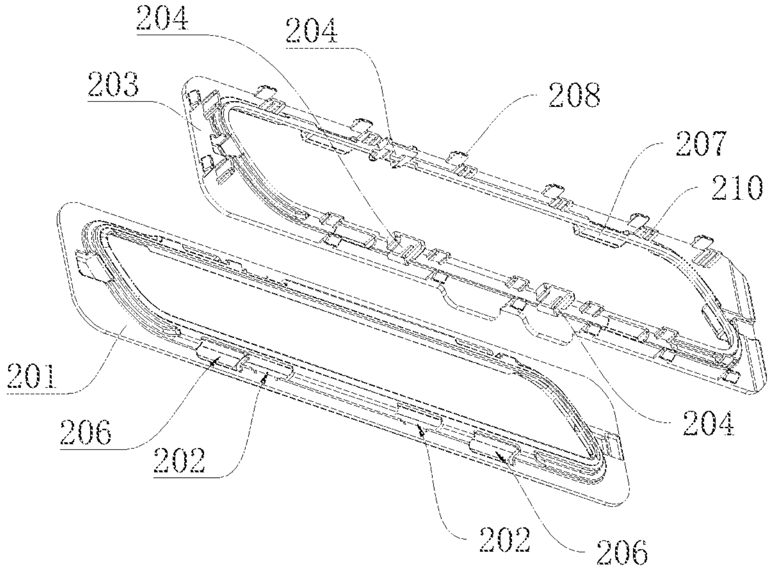
FIG. 9 is a second explosive view of an element structure of a mounting backing ring and a base mounting ring used by an embodiment of the application.

As a specific implementation of the embodiment of the application, referring to FIG. 6, narrow convex rings are disposed on the outer side face of the mounting backing ring 201 so that abnormal sound caused by large surface contact relative movement between the mounting backing ring 201 and the vehicle door outer plate 4 may be avoided.

As a specific implementation of the embodiment of the application, referring to FIG. 10 to FIG. 13, the second clamping pin connecting parts 3033 are inserting pillars, and inserting holes 310 matched with the inserting pillars in an inserting manner are formed in the base connecting rings 301.

Element Process:

- the mounting backing ring 201 sleeves the outer plate limiting plate 103, and the outer plate clamping plates 101 penetrate through the via holes 202;
- the base mounting ring 203 sleeves the mounting backing ring 201, and the first buckles 204 are clamped on the first bayonets 102, so that the base mounting ring 203 and the vehicle door outer plate 4 are assembled;
- the seat body buckles 3024 are inserted into the buckle notches 3025 respectively, and then the connecting seat bodies 3021 are rotated to make the seat body buckles 3024 screw into the rotary positioning grooves 3026, so that the connecting seat bodies 3021 and the clamping hook connecting parts 3022 are assembled;
- the clamping pin buckles 3034 are inserted into the clamping pin notches 3027, and meanwhile, the buckle limiting protrusions 3035 are inserted into the buckle notches 3025, so that the elastic clamping pins 303 and the clamping hook connecting parts 3022 are assembled, and meanwhile the positions of the seat body buckles 3024 are further limited by the buckle limiting protrusions 3035, so that the seat body buckles 3024 are prevented from disengaging out of the buckle notches 3025;
- the clamping hooks 3023 are clamped into the clamping protrusions 308, so that the base connecting rings 301 and the buckle type connecting seats 302 are assembled;
- the spiral grooves 307 in the stabilizing blocks 304 correspond to the spiral protrusions 306 on the base connecting rings 301, and the spiral protrusions 306 are inserted into the spiral grooves 307, so that the stabilizing blocks 304 and the base connecting rings 301 are assembled, and the above components are assembled to form the base element; and
- the connecting seat bodies 3021 on the base element are correspondingly inserted into the mounting holes 7 in the vehicle door outer plate reinforcing plate 6, the base 205 is clamped and mounted on the base connecting ring 203, and the bolts 9 are inserted and fixedly connected with the mounting holes 7 after expanding in the connecting seat bodies 3021, so that the base element and the vehicle door outer plate 4 are assembled.

According to the mounting mechanism for the hidden vehicle door handle provided by the application, the base element 2 may be precisely fixed, the tolerance absorption element 3 absorb the tolerances during fixing, and the mounting mechanism may be applied to other similar part mounting processes which require high mounting requirements, absorption of long-size chain tolerances and ensuring of appearance gaps and flushes; and meanwhile, the mounting process is not visual as the handle 5 is opposite to an operator during mounting, the handle is mounted after the base element is formed, the position of the base 205 may be finely adjusted by deformation of the elastic clamping pins 303 during inserting of the connecting seat bodies 3021, thus, the base 205 and the base mounting ring 203 are clamped, and the element difficulty of the operator is simplified to a large degree.

The application further provides a vehicle. The vehicle includes the above mounting mechanism for the hidden vehicle door handle.

According to the vehicle provided by the application, the appearances of a vehicle door and the handle are more attractive on the basis of meeting the requirement on the mounting strength of the handle by adopting the above mounting structure for the hidden vehicle door handle, which achieves the uniform gap and flush of the handle.

What is said above is only exemplary embodiments of the application without limiting the application, and any modifications, equivalent substitutes, improvements, etc. should be involved in the protection scope of the application as long as they are within the spirit and principle of the application.

The apparatus embodiment described above is only schematic, wherein units illustrated as separating components may be or may not be physically separated, and components displayed as units may be or may not be physical units, that is, they may be located in one place, or may be distributed on a plurality of network units. Part or all of modules may be selected according to actual requirements to achieve the objectives of the solution of the embodiment. Those ordinarily skilled in the art may understand and implement the embodiment without involving creative labor.

"One embodiment", "embodiments" or "one or more embodiments" in the text mean that specific features, structures or characteristics described with reference to the embodiments are contained in at least one embodiment of the application. In addition, please pay attention to the situation that word examples of "in one embodiment" do not necessarily refer to the same embodiment.

A large quantity of specific details are illustrated in the specification provided here. However, it is understandable that the embodiments of the application may be implemented without these specific details. In some examples, known methods, structures and technologies are not shown in details, so that understanding of the specification is not fuzzy.

In the claims, any reference symbols located between brackets should not be structured as the limitation to the claims. The word "comprising" does not exclude the existence of elements or steps not listed in the claims. "An" or "one" located before each element does not exclude the existence of a plurality of these elements. The application may be achieved through hardware comprising a plurality of different elements and a properly programmed computer. In the unit claims listing a plurality of apparatuses, the plurality of apparatuses may be specifically reflected through the same hardware item. Words of "first", "second", "third", etc. are used without representing any sequence. These words may be explained as names.

Finally, it should be noted that the above embodiments are only used for illustrating the technical solutions of the application without limiting them; although the application is illustrated in details with reference to the above embodiments, those ordinarily skilled in the art should understand that they still may modify the technical solutions recorded in the above embodiments, or equivalently substitute part of technical features therein; and these modifications or substitutes do not make the essence of the corresponding technical solutions depart from the spirit and scope of the technical solutions of the embodiments of the application.

The invention claimed is:

1. A mounting mechanism for a hidden vehicle door handle, wherein, the mounting mechanism for a hidden vehicle door handle comprises:

an outer plate mounting element, configured to be disposed on an inner side of a vehicle door outer plate, the outer plate mounting element and the vehicle door are disposed as an entirety;

a base element, configured to be connected with a handle, the base element is clamped and fixed to a designated mounting position by the outer plate mounting element; and a tolerance absorption element, fixedly connected with the base element and configured to be disposed between mounting holes and bolts on a vehicle door outer plate reinforcing plate, the tolerance absorption element is configured to absorb tolerances between the bolts and the mounting holes, and the vehicle door outer plate reinforcing plate is fixedly connected to the inner side of the vehicle door outer plate;

wherein the tolerance absorption element comprises:

a base mounting ring, which is disposed on the base element as an entirety, and a spiral protrusion is disposed on the inner ring surface of the base connecting ring;

a buckle type connecting seat, which is located on the inner side of the base connecting ring, the buckle type connecting seat is clamped with the base connecting ring, and configured to be inserted into the corresponding mounting hole;

an elastic clamping pin, which is disposed between the base connecting ring and the buckle type connecting seat, connected with the base connecting ring and the buckle type connecting seat, respectively, and configured to elastically deform on a plane parallel to the radial surface of the corresponding mounting hole; and a stabilizing block, which is disposed with a spiral groove matched with the spiral protrusion in an inserting manner;

inside of the stabilizing block, the elastic clamping pin and the buckle type connecting seat are disposed with through holes configured to allow the bots to penetrate.

2. The mounting mechanism for the hidden vehicle door handle according to claim 1, wherein the outer plate mounting element comprises a plurality of outer plate clamping plates, the plurality of outer plate clamping plates and the vehicle door outer plate are disposed as an entirety, the plurality of outer plate clamping plates are configured to be disposed surrounding a handle hole in the vehicle door outer plate, first bayonets are disposed on the outer plate clamping plates, and first buckles configured to clamp and fix with the first bayonets are disposed on the base element; and the outer plate mounting element further comprises an outer plate limiting plate, the outer plate limiting plate and the vehicle door outer plate are disposed as an entirety, the outer plate limiting plate is configured to be disposed surrounding the handle hole, groove-shaped positioning structures sleeving the outer plate limiting plate are disposed on the base element, and the first buckles are disposed at the groove-shaped positioning structures.

3. The mounting mechanism for the hidden vehicle door handle according to claim 2, wherein the base element comprises:

a mounting backing ring, disposed at the periphery of the outer plate limiting plate in a sleeving manner and provided with via holes allowing the outer plate clamping plates to penetrate;

a base mounting ring, disposed at the periphery of the mounting backing ring in a sleeving manner and provided with the first buckles, the mounting backing ring and the base mounting ring are matched to form the groove-shaped positioning structures; and a base, disposed at the inner side of the base mounting ring, clamped with the base mounting ring, and further configured to be connected with the handle.

4. The mounting mechanism for the hidden vehicle door handle according to claim 3, wherein positioning concavities are formed on the mounting backing ring, and positioning convex ribs correspondingly inserted into the positioning concavities are disposed on the outer side face of the base mounting ring.

5. The mounting mechanism for the hidden vehicle door handle according to claim 3, wherein a plurality of second buckles are disposed on the inner side face of the base mounting ring, the plurality of second buckles are disposed surrounding the base mounting ring, and a plurality of second bayonets clamped with the second buckles are disposed on the base.

6. The mounting mechanism for the hidden vehicle door handle according to claim 5, wherein a plurality of positioning pillars are disposed on the inner side face of the base mounting ring, the plurality of positioning pillars are disposed as surrounding the base mounting ring, and a plurality of positioning holes allowing the positioning pillars to be inserted and positioned therein are disposed on the base.

7. The mounting mechanism for the hidden vehicle door handle according to claim 1, wherein each of the elastic clamping pins comprises:

a first clamping pin connecting part connected with the buckle type connecting seat;

a plurality of elastic arms, disposed on the periphery of the first clamping pin connecting part, one end of each of the elastic arms is connected with the first clamping pin connecting part, and the plurality of elastic arms are configured to elastically deform on a plane parallel to the radial surfaces of the mounting holes; and second clamping pin connecting parts, which are disposed at the other ends of the elastic arms, correspond to the elastic arms one to one, and are connected with the base connecting ring.

8. A vehicle, wherein the vehicle comprises the mounting mechanism for a hidden vehicle door handle, wherein the mounting mechanism for the hidden vehicle door handle, wherein, the mounting mechanism for a hidden vehicle door handle comprises:

an outer plate mounting element, configured to be disposed on an inner side of a vehicle door outer plate, the outer plate mounting element and the vehicle door are disposed as an entirety;

a base element, configured to be connected with a handle, the base element is clamped and fixed to a designated mounting position by the outer plate mounting element; and a tolerance absorption element, fixedly connected with the base element and configured to be disposed between mounting holes and bolts on a vehicle door outer plate reinforcing plate, the tolerance absorption element is configured to absorb tolerances between the bolts and the mounting holes, and the vehicle door outer plate reinforcing plate is fixedly connected to the inner side of the vehicle door outer plate;

wherein the tolerance absorption element comprises:

a base mounting ring, which is disposed on the base element as an entirety, and a spiral protrusion is disposed on the inner ring surface of the base connecting ring;

a buckle type connecting seat, which is located on the inner side of the base connecting ring, the buckle type connecting seat is clamped with the base connecting ring, and configured to be inserted into the corresponding mounting hole;

an elastic clamping pin, which is disposed between the base connecting ring and the buckle type connecting seat, connected with the base connecting ring and the buckle type connecting seat, respectively, and configured to elastically deform on a plane parallel to the radial surface of the corresponding mounting hole; and a stabilizing block, which is disposed with a spiral groove matched with the spiral protrusion in an inserting manner;

inside of the stabilizing block, the elastic clamping pin and the buckle type connecting seat are disposed with through holes configured to allow the bots to penetrate.

9. The vehicle according to claim 8, wherein the outer plate mounting element comprises a plurality of outer plate clamping plates, the plurality of outer plate clamping plates and the vehicle door outer plate are disposed as an entirety, the plurality of outer plate clamping plates are configured to be disposed surrounding a handle hole in the vehicle door outer plate, first bayonets are disposed on the outer plate clamping plates, and first buckles configured to clamp and fix with the first bayonets are disposed on the base element; and the outer plate mounting element further comprises an outer plate limiting plate, the outer plate limiting plate and the vehicle door outer plate are disposed as an entirety, the outer plate limiting plate is configured to be disposed surrounding the handle hole, groove-shaped positioning structures sleeving the outer plate limiting plate are disposed on the base element, and the first buckles are disposed at the groove-shaped positioning structures.

10. The vehicle according to claim 9, wherein the base element comprises:

a mounting backing ring, disposed at the periphery of the outer plate limiting plate in a sleeving manner and provided with via holes allowing the outer plate clamping plates to penetrate;

a base mounting ring, disposed at the periphery of the mounting backing ring in a sleeving manner and provided with the first buckles, the mounting backing ring and the base mounting ring are matched to form the groove-shaped positioning structures; and a base, disposed at the inner side of the base mounting ring, clamped with the base mounting ring, and further configured to be connected with the handle.

11. The vehicle according to claim 10, wherein positioning concavities are formed on the mounting backing ring, and positioning convex ribs correspondingly inserted into the positioning concavities are disposed on the outer side face of the base mounting ring.

12. The vehicle according to claim 10, wherein a plurality of second buckles are disposed on the inner side face of the base mounting ring, the plurality of second buckles are disposed surrounding the base mounting ring, and a plurality of second bayonets clamped with the second buckles are disposed on the base.

13. The vehicle according to claim 12, wherein a plurality of positioning pillars are disposed on the inner side face of the base mounting ring, the plurality of positioning pillars are disposed as surrounding the base mounting ring, and a plurality of positioning holes allowing the positioning pillars to be inserted and positioned therein are disposed on the base.

14. The vehicle according to claim 8, wherein each of the elastic clamping pins comprises:

a first clamping pin connecting part connected with the buckle type connecting seat;

a plurality of elastic arms, disposed on the periphery of the first clamping pin connecting part, one end of each of the elastic arms is connected with the first clamping pin connecting part, and the plurality of elastic arms are configured to elastically deform on a plane parallel to the radial surfaces of the mounting holes; and second clamping pin connecting parts, which are disposed at the other ends of the elastic arms, correspond to the elastic arms one to one, and are connected with the base connecting ring.

* * * * *